P. I. GARNER.
CORN PLANTER.
APPLICATION FILED JULY 30, 1920.
1,423,932.
Patented July 25, 1922.
2 SHEETS—SHEET 1.
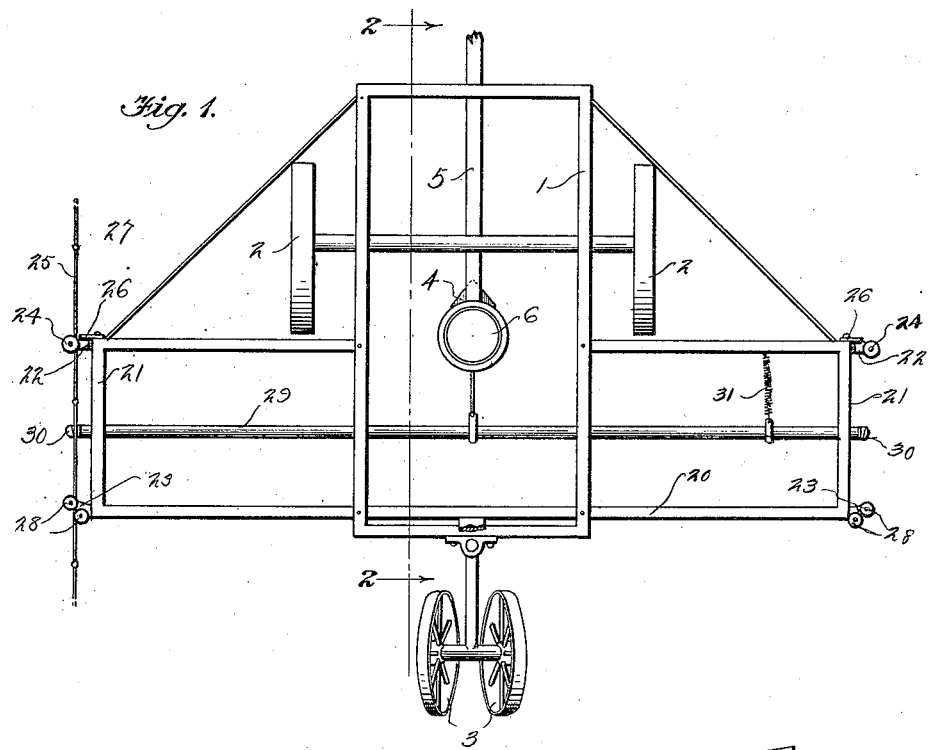
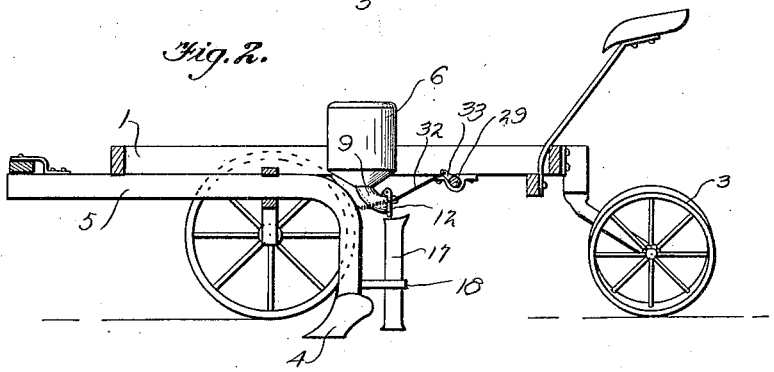
WITNESSES.
Perry I Garner INVENTOR.
BY
ATTORNEY.

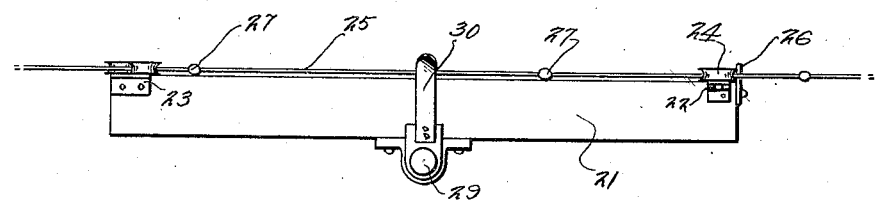
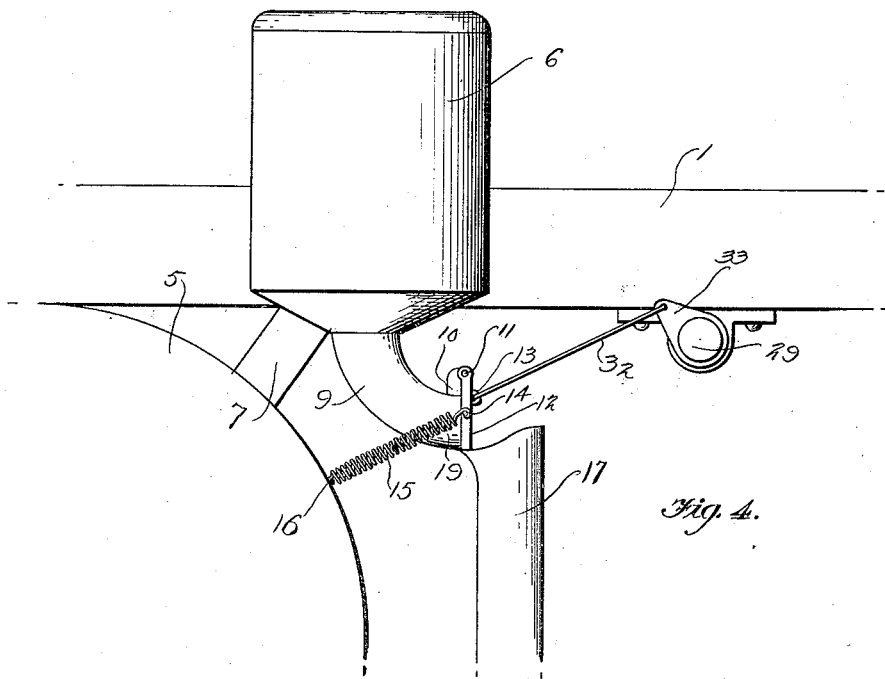

UNITED STATES PATENT OFFICE.

PERRY I. GARNER, OF EUREKA, KANSAS.

CORN PLANTER.

1,423,932.

Specification of Letters Patent. Patented July 25, 1922.

Application filed July 30, 1920. Serial No. 400,061.

*To all whom it may concern:*

Be it known that I, PERRY I. GARNER, a citizen of the United States, residing at Eureka, in the county of Greenwood and State of Kansas, have invented certain new and useful Improvements in Corn Planters, of which the following is a specification.

This invention relates to new and useful improvements in corn planters and more particularly to that type better known as a check row corn planter, the primary object of the invention being to provide an attachment for a farm implement, such as a lister plow whereby the same may be rendered capable of being used as a corn planter.

Another object of the invention is to provide improved means which are of simple and efficient construction whereby the seed may be automatically dropped at the proper intervals in the furrow.

Another object of the invention is to provide a seed box having a tortuous passage way leading therefrom to convey the seed into the furrow and means in the passage way for controlling the passage of feed therethrough.

A further object of the invention is to provide a finger cooperating with a movable check row head for preventing accidental displacement of the rower line from the sheave carried by the check row head during the operation of the planter, said check row head being movable to facilitate engagement of the line with the sheave carried by the head.

Other objects and advantages of the invention will become apparent during the course of the following description.

In the accompanying drawings forming a part of the application and wherein like numerals are employed to designate like parts throughout the several views Figure 1 is a top plan of the planter.

Figure 2 is a longitudinal section of the same taken on the line 2—2 of Figure 1.

Figure 3 is an end elevation of the planter frame, and

Figure 4 is a side elevation of the feed controlling mechanism.

Referring to the accompanying drawings wherein I have illustrated the preferred embodiment of my invention, the numeral 1 designates an ordinary lister frame provided with trundle wheels 2 and a pair of covering wheels 3 it being noted that the covering wheels 3 are arranged at the rear end of the lister frame and directly in the rear of the plow 4 carried by the beam 5.

A seed box 6 is suitably mounted upon the lister frame, but is herein shown as supported by a bracket 7 carried by the plow beam 5 whereby the feed box may be arranged over the plow 4. The bottom of the feed box tapers downwardly and inwardly as is clearly seen in Figure 4 and terminates in an arcuate rearwardly extending tube 9, the outlet end of which is arranged in a horizontal plane. An upwardly extending lug 10 is provided upon the outlet end of the tube 9 and carries a pivot pin 11 upon which is pivotally mounted a feed plate 12 for normally closing the outlet end of the tube 9. The feed plate 12 has its outer face equipped with an apertured ear 13 and a pin 14 extends from one side of the feed plate to provide securing means for fastening one end of a coiled spring 15 to the feed plate. The opposite end of the coiled spring is secured as at 16 to the plow beam and from this construction it will be obvious that the feed plate is normally held against the open end of the tube 9 to prevent accidental escape of seed therefrom.

Arranged directly under the outlet end of the tube 9 is the upper end of a vertically disposed tube 17 which is supported by a bracket 18 extending from the plow beam whereby the lower end of the tube 17 may follow in the furrow directly behind the plow 4 to distribute seeds. From the foregoing description, it will be obvious that the tubes 9 and 17 form a tortuous passage way from the feed box and that this passage way is provided with an offset as at 19. Due to this arrangement and the fact that the outlet end of the tube 9 is disposed in approximately a horizontal plane, it will be seen that seeds will not flow rapidly to the passage way formed by the tube, but will drop one at a time as soon as the feed plate 12 is opened.

The planter frame 20 which is detachable from the lister frame 1 is rectangular in shape the ends of the planter frame being extended substantial distances beyond either side of the lister frame. The ends 21 of the planter frame provide means for mounting the movable check row heads 22 mounted at the forward ends of the frame 20 and the stationary check row heads 23 mounted at the rear end of the ends 21. A vertically disposed sheave 24 is mounted upon each check row head 22 and in order to maintain the ordinary rower line 25 in engagement therewith, I secure a laterally projecting finger 26 to each end of the frame so that the free end of the finger is disposed in close proximity to its respective sheave 24. However, there is sufficient space between the finger 26 and the sheave to permit the buttons or tappets 27 to pass therebetween. It is also to be noted that the movable check row heads are connected to the ends of the planter frame to swing outwardly thereof and the ends of the fingers 26, thereby providing means whereby the rower line may be readily associated with the sheaves carried by the check row heads. The stationary check row heads 23 project laterally beyond the ends of the planter frame and are each provided with a pair of sheaves 28, the axes of which are arranged angularly relative to the planter frame whereby the check rower line 25 may readily pass between these sheaves.

Extending transversely of the frame 1 and longitudinally of the planter frame is a shaft 29 which is journaled in bearings carried by the two frames. The opposite ends of this shaft project beyond the ends 21 of the planter frame and are each provided with a normally upstanding forked lever 30, it being well understood that a check row line extends through the fork in the well known manner whereby the button carried by the line may engage the lever at intervals for oscillating the shaft 29. In order to return the shaft to its normal position after it has been rocked, a coiled spring 31 is provided and has one end secured to a clamp fastened to the shaft while the opposite end of the spring is secured to the planter frame in a manner whereby the shaft when being operated will place the spring under tension. A rod or link 32 has one end connected to the apertured ear 13 of the feed plate 12 and its opposite end connected to a laterally projecting arm 33 fastened to the shaft 29. Obviously then, it will be seen that when the shaft 29 is oscillated by the buttons of the check roller line engaging the forked lever 30, that the rod 32 will be moved to open the feed plate. This action will of course tension the spring 15 as well as the spring 31 as hereinbefore set forth and as soon as the buttons of the check roller line disengage the forked lever 30, the oscillatory shaft 29 and the feed plate 12 will be returned to their normal positions. As the feed plate is opened, it will be obvious that one or two seeds will be permitted to escape from the tube 9 into the tube 17, whereupon the seeds will drop into the furrow and be covered by the covering wheels 3 in a manner well understood.

The foregoing description and the accompanying drawings have reference to the preferred or approved embodiment of my invention. It is to be noted however, that such changes in construction and arrangement of parts, materials, dimensions, etc. may be made as fall within the scope of the appended claim.

Having thus fully described my invention what I claim as new and desire to secure by Letters Patent is:—

In a planter, a seed box, a seed plate pivoted thereto, a spring for normally retaining said seed plate in a closed position, an oscillatory shaft, means connecting said shaft and said seed plate for operating the latter, and a coiled spring connected to the shaft and planter for returning the oscillatory shaft to a normal position whereby the seed plate may be closed by its spring.

In testimony whereof I affix my signature in presence of two witnesses.

PERRY I. GARNER.

Witnesses:
C. A. DOUD,
JOHN SELBACH.